(No Model.)

I. DART.
ICE VELOCIPEDE.

No. 471,959. Patented Mar. 29, 1892.

WITNESSES:
Donn Twitchell
E. M. Clark

INVENTOR:
Isaac Dart
BY Munn & Co.
ATTORNEYS

UNITED STATES PATENT OFFICE.

ISAAC DART, OF SWANZY, MICHIGAN.

ICE-VELOCIPEDE.

SPECIFICATION forming part of Letters Patent No. 471,959, dated March 29, 1892.

Application filed November 11, 1891. Serial No. 411,581. (No model.)

*To all whom it may concern:*

Be it known that I, ISAAC DART, of Swanzy, in the county of Marquette and State of Michigan, have invented a new and Improved Ice and Snow Velocipede, of which the following is a full, clear, and exact description.

The object of the invention is to provide a new and improved ice and snow velocipede, which is simple and durable in construction and arranged for traveling rapidly over ice or hard snow tracks.

The invention consists of a frame mounted on runners, and a wheel journaled in the frame and provided with spring-pressed spikes.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1:
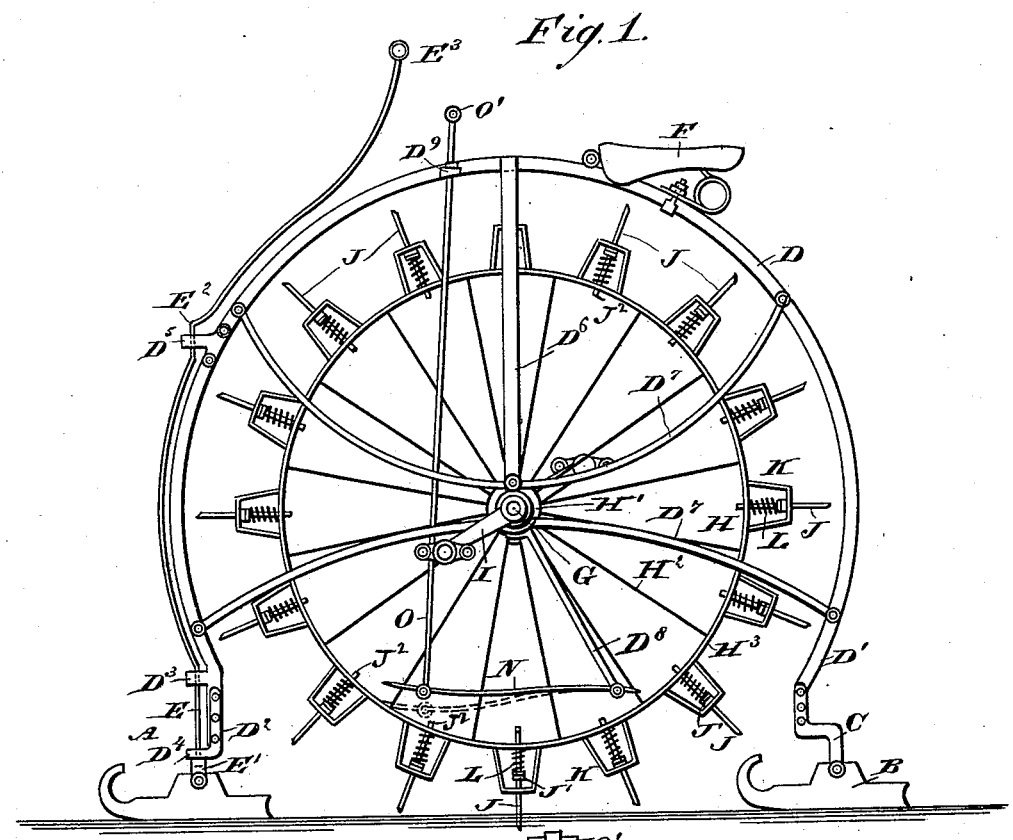
Figure 3:
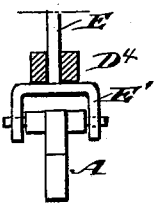
Figure 2:
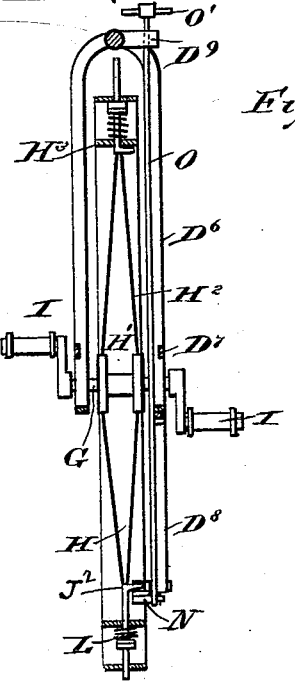

Figure 1 is a side elevation of the improvement. Fig. 2 is a transverse section of the same; and Fig. 3 is an enlarged end elevation of the front runner and part of the steering device, with the frame in section.

The improved velocipede is provided with a front runner A and a rear runner B, the latter being pivotally connected to an arm C, secured to one end D' of a segmental frame D, provided at its front end $D^2$ with lugs $D^3$ and $D^4$, through which passes vertically the steering-rod E, formed at its lower end with a fork E', made U-shaped, and on the top of which rests the lug $D^4$ of the front end of the frame. The fork E' is pivotally connected with the front runner A, so that the frame D is supported from the two runners A and B. The steering-rod E extends along the front end of the frame D, and is provided at about its middle with a vertically-arranged offset $E^2$, in line with that part of the rod E extending between the lugs $D^3$ and $D^4$. The part $E^2$ is mounted to turn in a lug $D^5$, also arranged on the frame D, so that the steering-rod can be conveniently turned in its bearings—that is, the lugs $D^5$, $D^3$, and $D^4$—to turn the runner A in the desired direction. The upper end of the steering-rod E is formed with a suitable handle $E^3$ under the control of the operator, seated on the seat F, attached to the upper part of the frame D and slightly at the rear of the vertical center, as is plainly shown in Fig. 1. From the middle of the segmental frame D extends downward the U-shaped frame $D^6$, formed with suitable bearings for the main shaft G, carrying the wheel H, concentric to the frame D. On the outer ends of the shaft G are arranged the usual treadles I for rotating the wheel in the usual manner.

The wheel H is provided with a suitable hub H', spokes $H^2$, and a rim $H^3$, in which latter are arranged, radially, the spikes J, located suitable distances apart and adapted to engage the ice or snow between the runners A and B. Each of the spikes J has its outer bearing in a frame K, and on each spike, within the frame K, is secured a nut or collar J', on which presses one end of a spring L, coiled on the spike J within the frame and resting with its other end on the rim $H^3$. It will be seen that when the wheel H is rotated the spikes, when passing into a lowermost position, engage the ice or snow of the track, the said spikes J sliding inward against the tension of the springs L, which latter have the tendency to force the spikes into contact with the snow or ice. The distance the spikes pass into the snow or ice depends on the strength of the spring L and the hardness of the snow or ice. As the spikes J pass into the snow the wheel rolls forward, the weight of the operator, as well as that of the frame, &c., being sustained by the runners A and B. The latter render the forward gliding motion of the velocipede very easy over the smooth track. The lower ends of the frame $D^6$ are reinforced by curved braces $D^7$, connected with the frame D, as is plainly shown in Fig. 1. From the extreme lower ends of the bearings of the frame $D^6$ projects downward and rearward an arm $D^8$, on which is pivoted an arm or lever N, adapted to pass with its pointed free end close to the inner surface of the rim $H^3$ of the wheel H, so as to engage an arm $J^2$, projecting from the inner end of each spike J. The lever N is pivotally connected with an upwardly-extending rod O, having its bearing in a lug $D^9$, projecting from the top of the frame D. On the upper end of the brake-rod O is secured a handle O' under the control of the operator seated on the seat F. In the normal position the lever N is out of contact with the spikes; but when it is desired to run the velocipede without the spikes coming in contact with the track then the operator moves the rod O downward to move the free sharp end of the lever N in the path of the arms J² of the spikes. The latter in their forward movement are drawn inward by traveling along the lever N, so that their points are lifted above the track and do not touch the same when in a lowermost position, thus allowing the wheel to run free. The arms J² finally drop off the pointed end of lever N on further rotation of the wheel. It will be seen that the operator by working the treadles I rotates the wheel H so that the latter rolls forward on the track by its spikes J engaging the ice or snow, as above described.

It will be seen that the weight of the operator, the frame D, supporting the wheel H, and the spike-drawing mechanism, as well as the steering device, is supported on the runners A and B, so that the spikes of the wheel H easily engage the track to propel the velocipede forward.

Having thus described my invention, I claim as new and desire to secure by Letters Patent—

1. An ice-velocipede comprising a frame, a rear runner pivotally connected to the rear end of the frame, a steering-rod mounted in the forward part of the frame and having a forked lower end, a front runner pivoted in the forked end of the steering-rod, and a propelling-wheel mounted in the frame in alignment with the runners and provided with spring-pressed spikes, substantially as described.

2. In an ice and snow velocipede, the combination, with a frame mounted on runners, of a wheel mounted in the frame and provided with spring-pressed spikes, and means for drawing the spikes inward as the wheel is revolved, substantially as and for the purpose set forth.

3. In an ice and snow velocipede, the combination, with a front and rear runner, of a frame supported on the said runners, a wheel mounted to turn in the said frame, spring-pressed spikes held on the rim of the said wheel and adapted to engage the track between the said runners, treadles held on the shaft of the said wheel for operating the latter, and a lever supported on the said frame and adapted to withdraw the spikes of the said wheel, substantially as shown and described.

4. In an ice and snow velocipede, the combination, with a front and rear runner, of a frame supported on the said runners, a wheel mounted to turn in the said frame, spring-pressed spikes held on the rim of the said wheel and adapted to engage the track between the said runners, treadles held on the shaft of the said wheel for operating the latter, a lever supported on the said frame and adapted to engage the spikes of the said wheel, and means, substantially as described, for operating the said lever, as set forth.

5. An ice and snow velocipede provided with a wheel comprising a hub, spokes, a rim, frames secured on the said rim, spikes fitted to slide in the said rim and frames, and a spring coiled on each spike and pressing with one end on the said rim and with the other end on a collar on the said spike within the said frame, substantially as shown and described.

ISAAC DART.

Witnesses:
   JOSEPH H. PRIMEAU,
   BAPTISTE BARASA.